T. J. BOUNIMOVITSCH.
WINDING MECHANISM FOR SPRING MOTORS.
APPLICATION FILED JUNE 27, 1911.

1,040,271.

Patented Oct. 8, 1912.
3 SHEETS—SHEET 1.

T. J. BOUNIMOVITSCH.
WINDING MECHANISM FOR SPRING MOTORS.
APPLICATION FILED JUNE 27, 1911.

1,040,271.

Patented Oct. 8, 1912.
3 SHEETS—SHEET 3.

UNITED STATES PATENT OFFICE.

TOWY J. BOUNIMOVITSCH, OF WILNA, RUSSIA.

WINDING MECHANISM FOR SPRING-MOTORS.

1,040,271.  Specification of Letters Patent.  Patented Oct. 8, 1912.

Application filed June 27, 1911. Serial No. 635,623.

*To all whom it may concern:*

Be it known that I, TOWY J. BOUNIMOVITSCH, technical manager, a subject of the Emperor of Russia, residing at 11 Kaukasischestrasse, in the city of Wilna, in the Russian Empire, have invented certain new and useful Improvements in Winding Mechanisms for Spring-Motors, of which the following is a specification.
The present invention relates to improvements in winding devices for spring motors and particularly to winding devices which are adapted for use in talking machines in which an electric motor serves to wind the spring motor and is automatically switched off on a given tension of the spring being reached and refers particularly to a simple constructional form of the parts serving for said switching off operation. These consist of a contact lever arranged to be engaged manually for the circuit of the electric motor and of an abutment member rotated by the spring motor, which abutment member will, when a given tension of the spring has been reached, force the contact lever from its contact seat and then rotate it inoperatively until the contact lever is again manually engaged. This inoperative rotation of the abutment member may also be enabled by a recess in the contact lever or the like.

Figure 1:
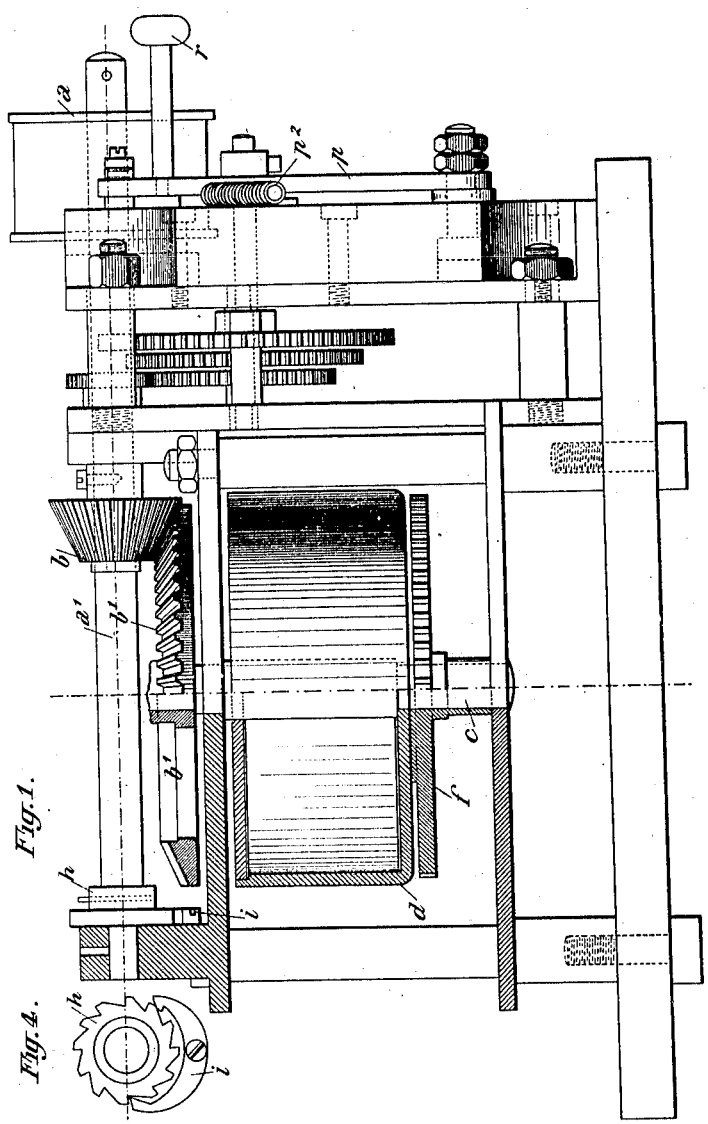
Figure 2:
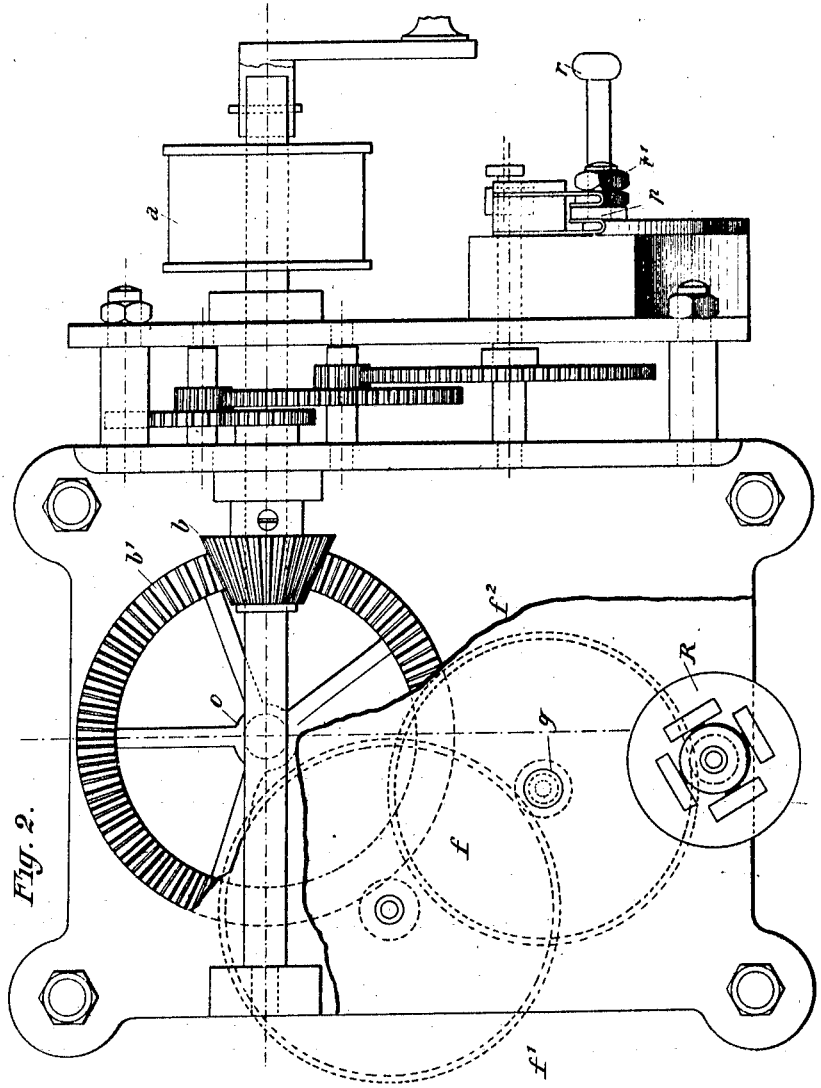
Figure 3:
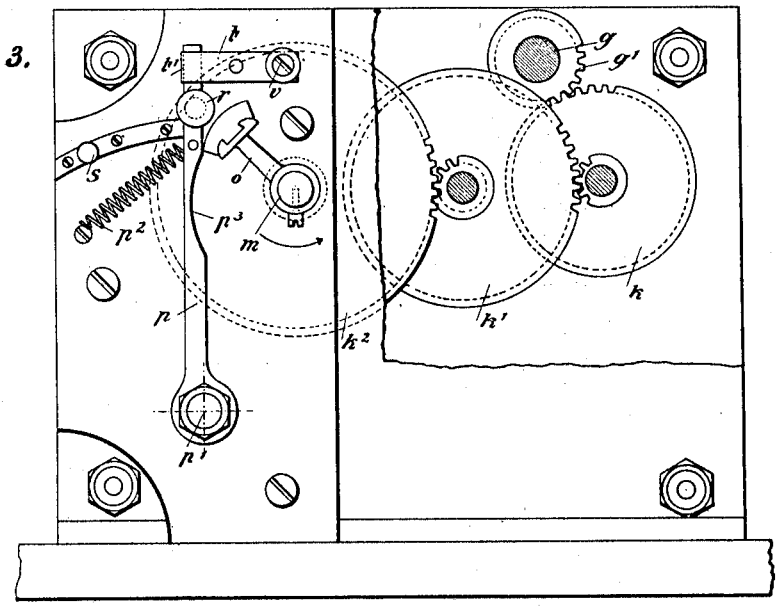
Figure 5:
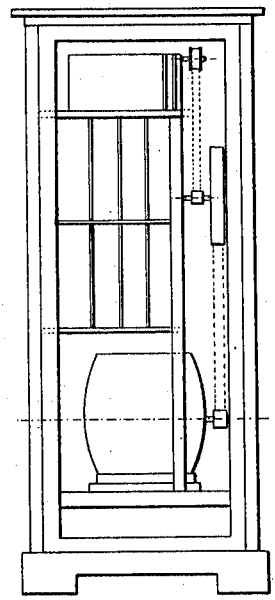
Figure 6:
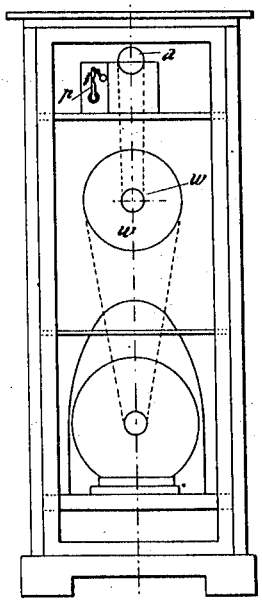

In the accompanying drawing a constructional form of the present invention is exemplified, showing the switching gear.
In this drawing Figure 1 is a side view of a driving gear for a talking machine fitted with the switching gear; Fig. 2 is top view of Fig. 1; Fig. 3 is a front view or the switch and its driving parts; Fig. 4 is a side view of the ratchet wheel brake for the spring case spindle; Figs. 5 and 6 show in diagrammatio front and side views respectively a talking machine the spring-motor of which is wound by means of a high-speed motor acting through a countershaft.

The drive is effected by means of an electric motor which drives in known manner the belt pulley $a$ and rotates by means of the bevel gears $b$ and $b'$ the spindle $c$ at a speed of about 100 to 175 revolutions in the minute. On spindle $c$ is fitted the spring case $d$ the spring of which is secured at one end to the case $d$ and at the other end to the spindle $c$. The movement of the spring case is likewise transmitted in known manner by the wheel and pinion gearing $f$, $f^1$, $f^2$ to a disk record spindle $g$ the speed of which is controlled by a governor. R. While the spring is being wound the spring case $d$ is arrested by means of a ratchet wheel $h$, in which engages a pawl $i$, Fig. 4. On the record spindle $g$ is fitted a pinion $g^1$ which will transmit the rotation of said spindle $g$ by means of the gears $k$, $k^1$, $k^2$ to the spindle $m$ of the arm $o$ serving to switch off the electric motor; this arm is fitted to the spindle $m$ in a manner corresponding with the number of revolutions of the driving spindle $a^1$, but so that the electric motor will be switched off shortly before the spring has been fully wound. At the side or above the counter arm $o$ a lever $p$ is pivotally fitted at $p^1$ to the body of the machine, which lever is under action of a tensile spring $p^2$ and has a shallow curved recess on its side turned toward the counter arm $o$, the curve of which recess corresponds with the curve of the end of the arm $o$, so that when the lever $p$ is pulled forward the said arm $o$ may clear and pass it. On the side of lever $p$ is arranged a knob $r$ by means of which the lever may be moved against the action of the spring $p^2$. The stroke of the lever or circuit-controlling switch-arm $p$ under action of the spring $p^2$ is limited by means of an abutment $s$ provided on a curved bar on the body of the machine. To the said body is bolted a bifurcated bearing $t$ at such a distance from lever $p$ that the end of the latter can engage into the bifurcation $t^1$, Fig. 2. On this bearing is arranged the binding post screw $v$ for the one wire leading to the electric motor, while the other wire is connected with the fulcrum of the lever.

The arrangement operates in the following manner: When the lever $p$ is manually turned by means of the knob $r$ against the action of spring $p^2$, the end of this lever $p$ is engaged in the bifurcation $t^1$ of the bearing $t$ whereby the circuit is closed for the electric motor. This circuit will start the driving shaft $a^1$ and turn the counter arm $o$ in the direction of the arrow, Fig. 3. When the spindle $a^1$ has completed a given number of revolutions, in correspondence with which number of revolutions the position of arm $o$ has been determined, the said arm $o$ will abut against lever $p$ and force the latter from its seat in the bifurcation $t^1$ whereby the circuit will be interrupted, so that the electric motor will gradually come to a stop under action of the brake spring in the case $d$, during which slowing down the arm $o$ will clear the lever $p$ in consequence of the recess $p^3$.

The switch may be arranged as shown in the drawing in the direction of the driving spindle $a^1$ or in case the apparatus is intended to drive several records in the direction of the spindle of the spring case, in which instance the gears will of course have to be accordingly arranged.

When the electric motor has a very high speed say about 1500 revolutions, an intermediate countershaft $w$, Fig. 6, may be employed at a suitable position in the record cabinet or elsewhere.

The hereinbefore described arrangement for interrupting the circuit of the electric motor may be employed in all cases in connection with musical instruments in which a spring is to be wound up, (for example, in connection with pianos and orchestrions) and which reproduce the melody by mechanical means, and in connection with all such instruments.

I claim:

1. In a talking machine, the combination with a spring-motor; of an electric motor for winding the same; a manually-operable circuit-controlling switch-arm arranged to make the circuit of said electric motor; and a rotatable arm which is coupled to said spring-motor and is driven by said electric motor and which automatically throws said switch-arm into open position, when the spring of said spring-motor has attained a given tension.

2. In a talking machine, a record-spindle; a spring-motor for driving the same; an electric motor for winding up said spring-motor; a manually-operable switch-arm one end of which is in the circuit of said electric motor; a contact-plate which is in said circuit and which is arranged to engage said switch-arm to close the said circuit; and a device for throwing said switch-arm out of contact with said contact-plate, when a given tension of the spring of said spring-motor has been reached.

3. In a talking machine, a record spindle; a spring-motor for driving the same; an electric motor for winding up said spring-motor; a manually-operable switch-arm one end of which is in the circuit of said electric motor; a contact-plate which is in said circuit and which is arranged to engage said switch-arm to close the said circuit; a spring which is connected with said switch-arm and which tends to hold the latter out of contact with said contact-plate and to maintain said circuit interrupted; and an arm coupled with said spring-motor for throwing said switch-arm out of contact with said contact-plate when a given tension of the spring of said spring motor has been reached.

4. In a talking machine, the combination with a spring-motor; of an electric motor for winding the same; a manually-operable circuit-controlling switch-arm arranged to make the circuit of said electric motor; and a rotatable arm which is coupled to said spring-motor and is driven by said electric motor and which automatically throws said switch-arm into open position, when the spring of said spring-motor has attained a given tension; said device being free to pass said switch-arm, after the latter is electrically disconnected from said contact-plate.

5. In a talking machine, the combination with a spring-motor: of an electric motor for winding the same; a bifurcated contact-plate in circuit with said electric motor; a manually-operable circuit-controlling switch arm arranged to be thrown by hand into interlocking engagement with the bifurcated part of said contact-plate, which grips and retains said switch-arm; and a rotatable arm which automatically throws said switch-arm out of engagement with said bifurcated part to open the circuit of said electric motor, when the spring of said spring-motor has attained a given tension.

In testimony whereof I have affixed my signature in presence of two witnesses.

TOWY J. BOUNIMOVITSCH.

Witnesses:
 JOZEF FOMECZ LIMASZEWICZ,
 LEIBA ITZKOW STOTSIK.